United States Patent
Nguyen

(10) Patent No.: US 11,122,445 B2
(45) Date of Patent: Sep. 14, 2021

(54) SYSTEM AND METHOD FOR MOBILE DEVICE FUNCTIONALITY TESTING

(71) Applicant: Tu Nguyen, Fremont, CA (US)

(72) Inventor: Tu Nguyen, Fremont, CA (US)

( * ) Notice: Subject to any disclaimer, the term of this patent is extended or adjusted under 35 U.S.C. 154(b) by 56 days.

(21) Appl. No.: 16/383,173

(22) Filed: Apr. 12, 2019

(65) Prior Publication Data

US 2019/0320331 A1    Oct. 17, 2019

Related U.S. Application Data

(60) Provisional application No. 62/656,913, filed on Apr. 12, 2018.

(51) Int. Cl.
*H04W 24/00*    (2009.01)

(52) U.S. Cl.
CPC ................... *H04W 24/00* (2013.01)

(58) Field of Classification Search
CPC ..... H04W 24/00; H04W 24/02; H04W 24/04; H04W 24/06; H04W 24/08; H04W 24/10

USPC .......................................................... 455/423
See application file for complete search history.

(56) References Cited

U.S. PATENT DOCUMENTS

| | | | |
|---|---|---|---|
| 2009/0312009 A1* | 12/2009 | Fishel | H01Q 1/241 455/425 |
| 2016/0337053 A1* | 11/2016 | Diperna | H04B 17/11 |
| 2017/0028569 A1* | 2/2017 | Matthews | G01M 99/008 |
| 2017/0052527 A1* | 2/2017 | Dougherty | G05B 19/402 |
| 2017/0156073 A1* | 6/2017 | Liu | H04N 17/002 |
| 2020/0240876 A1* | 7/2020 | Kim | G01M 99/005 |

* cited by examiner

*Primary Examiner* — Huy C Ho

(74) *Attorney, Agent, or Firm* — Womble Bond Dickinson (US) LLP; Joseph Bach, Esq.

(57) ABSTRACT

An automated system which tests the functionality of the components of mobile devices. The system is capable to test different mobile devices and is capable of accepting and testing several devices simultaneously. The system is capable of inspecting the display, testing the microphone and speakers, testing connectivity, such as USB and headphone connectivity, testing wireless charging, etc.

23 Claims, 3 Drawing Sheets

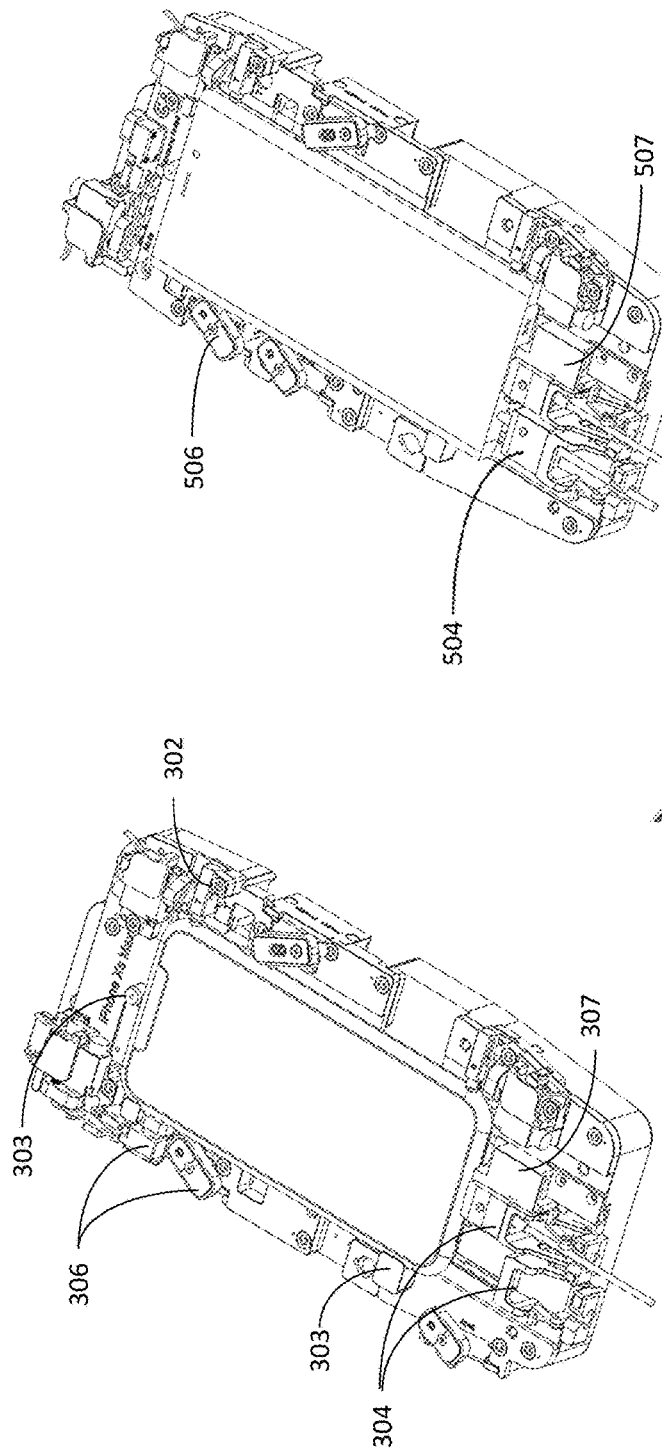
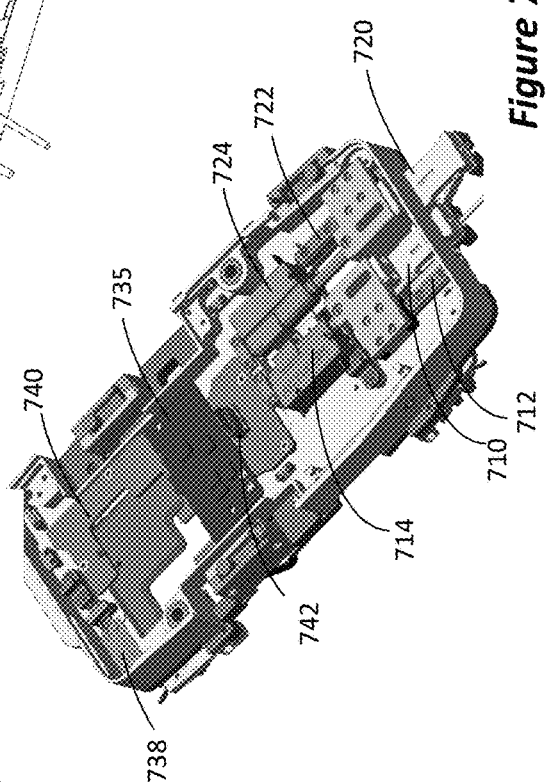

SYSTEM AND METHOD FOR MOBILE DEVICE FUNCTIONALITY TESTING

RELATED APPLICATION

This application claims priority benefit from U.S. Provisional Application No. 62/656,913, filed on Apr. 12, 2018, the disclosure of which is hereby incorporated herein by reference in its entirety.

BACKGROUND

1. Field

This disclosure relates to evaluation of the functionality of used mobile devices, such as smartphones.

2. Related Arts

When new mobile devices become available, many users opt to upgrade to the new model by trading-in their old device. Consequently, companies obtain many used devices that they can sell on the used mobile-device market. However, prior to reselling the devices it is prudent to test the devices to make sure all of the device's components function properly.

3. Problem to be Solved

Currently, the main method is for a reseller to test each device manually by going through a manual test routine. However, such testing is tedious and takes too much time, therefore adding cost to the repurposing of the device. It is therefore desirable to provide a system and a unified method for testing the functionality of the various components of the devices.

SUMMARY

The following summary is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

An automated system which tests the functionality of the components of mobile devices. The system is capable of testing different mobile devices and is capable of accepting and testing several devices simultaneously. The system is capable of inspecting the display, testing the microphone and speakers, testing wired connectivity, such as USB and headphone connectivity, testing wireless connectivity and wireless charging, etc.

A system for testing functionality of mobile devices is disclosed, comprising: a stage having a plurality of testing stations, each configured to receive one adapter; a plurality of adapters, each configured to receive at least one model of mobile device; an actuating head having a selector with a plurality of styluses; a placement system configured to transport the actuating head among the testing stations; at least one camera coupled to the placement system and configured to take images of screens of mobile devices; a picture presentation apparatus configured for presenting different pictures to be imaged by the mobile devices; and, a controller for activating the system for testing the mobile devices and evaluating data received from the system to determine the functionality of modules within each mobile device. The picture presentation apparatus is positioned below the stage, and wherein each of the testing stations include a window configured to expose part of the picture presentation apparatus to a camera of the mobile device. The system may further comprise a plurality of motion actuators configured to move the adapters in three-dimension in space. The motion actuator may comprise a rotation table, a motor coupled to one side of the rotation table, and a 3D rotation support urged against a roller.

A system for testing functionality of cellphones is disclosed, comprising: a test bench having a plurality of test stations, each configured for receiving one adapter and each having a window; a plurality of adapters, each configurable to accept one cellphone selected from a plurality of cellphone models, each adapter having at least one cable actuator and one hard-button actuator; a stylus selector having a plurality of styluses; a placement mechanism configured to for placing the stylus selector above any of the adapters; and a conveyor positioned below the test bench and having a plurality of picture plates formed thereupon. The placement mechanism may comprise a z-actuator configured to position the stylus selector vertically, and a gimbal configured to position the z-actuator within the horizontal plane. The system may include one or two cameras and a speaker mounted onto the z-actuator. Each of the cable adapters may comprise a plug housing slidably mounted on a linear track, and a motor sliding the plug housing. A plurality of rotating tables can be included, each provided between the test bench and one of the adapters, the rotating table configured for imparting 3-D motion to the adapter.

Other aspects and features of the invention would be apparent from the detailed description, which is made with reference to the following drawings. It should be appreciated that the detailed description and the drawings provide various non-limiting examples of various embodiments of the invention, which is defined by the appended claims.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

FIG. 5 illustrates the adapter of FIG. 3 with a phone installed;

FIG. 6 illustrates another embodiment of an adapter;

FIG. 7 illustrates an underside of an adapter according to an embodiment; and, FIG. 8 illustrates an embodiment of a rotation table.

DETAILED DESCRIPTION

Embodiments disclosed herein were developed in order to provide automated testing of the functionality of various modules of mobile devices, especially cellphones. The disclosed embodiments include various features, all of which may or may not be implemented in a single system. Disclosed aspects and features may be "mixed and matched" in a particular system according to user's requirements, phone models, and use cases.

Figure 1:
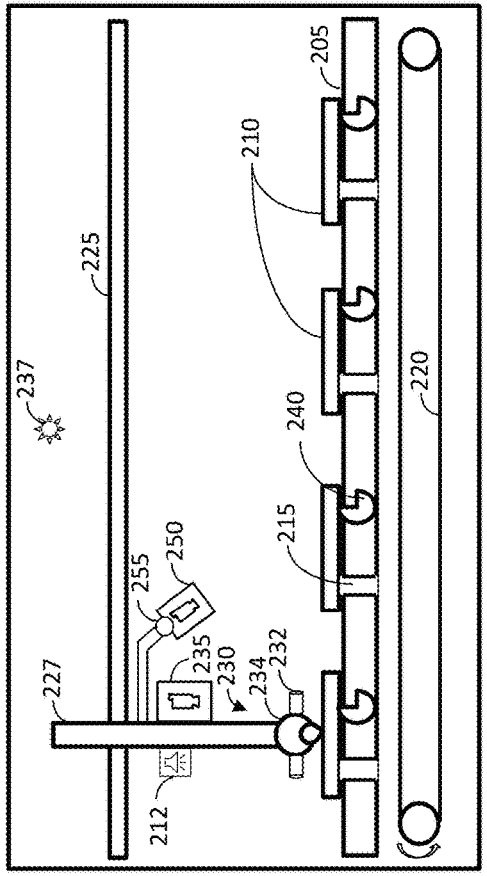
FIG. 1 is a schematic illustrating an exterior of a system according to an embodiment of the invention.

FIG. 1 illustrates the general exterior of the system 100 of the embodiment of the tester. The tester generally includes a housing 101 and a computer controlling the modules operating within the housing. The computer itself may be incorporated within the housing, or may be provided separately and have connectivity to the modules within the housing. A screen 105 provides the operator with relevant operating data. Front door 110 enables the user to load and unload phone adapters carrying phones to be tested. The front door 110 may include a window 115, enabling the user to view the operation of the system. The front door 110 will automatically close when starting the process, and open when ending the process. A sensor 120 on the front door 110 supports to stop the movement of the door right away if it detects an obstacle like human's hand obstructing its way.

Figure 2:
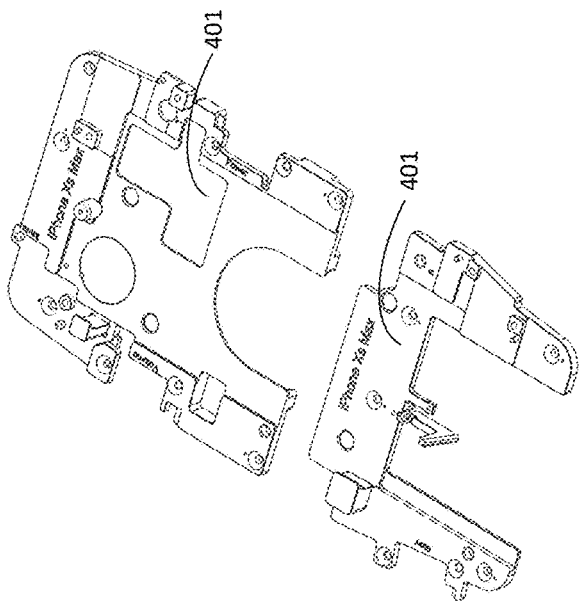
FIG. 2 is an illustration showing the major parts of the system of FIG. 1.

The major parts and modules of the internals of system 100 are shown in FIG. 2, which is a general schematic of a front view with the front part of the housing removed. The system includes a table (also referred to as a stage) 205, upon which plurality of adapters 210 are removably positioned. Each adapter 210 holds one mobile device, e.g., a smartphone. The table 205 includes a plurality of windows 215, each positioned to allow the camera of the respective mobile device to photograph a picture, through the window 215, wherein the picture is positioned below the table 205 and is visible through the window 215. A conveyor belt 220 is positioned below the table 205 and includes plurality of pictures printed on or attached to the belt 220, such that each picture can be positioned below each of the windows 215 to be photographed by one of the mobile devices.

A placement mechanism, e.g., a gimbal 225 and Z-actuator 227, is provided above the table 205 to enable placing of an actuating head 230 anywhere within the housing. In this example, the gimbal can place the Z-actuator 227 at any location in the horizontal plane (x-y coordinates) within the testing system. The z-actuator 227 supports the actuating head 230 and can move the actuating head 230 in elevation (z coordinate). The actuating head 230 supports a plurality of styluses 232 attached to a selector, such as a turret 234. In one embodiment one stylus simulates a finger print, one stylus simulates a blunt finger touch and one stylus simulates a sharp stylus, but any combination of styluses may be used.

A camera 235 is attached to the placement mechanism and is configured to take pictures of the screen in order to verify the functionality of the screen. The camera is a fixed-angle camera positioned in a true vertical orientation such that its optical axis intersects the screen orthogonally. The illumination inside the system can be controlled using illumination source 237. Also, speaker 212 is activated to test the microphone functionality of the phone on adapter 210. Motorized actuators, such as actuating cams 240, can individually move each adapter 210 in three-dimensions in order to test the functionality of the motion sensor within the mobile device. An example of a specific motorized actuator will be described further below with respect to FIG. 8.

Optionally, a tilting camera 250 is attached to the Z-actuator 227 and is configured to take pictures of the device screen with different angles in order to verify the functionality of the screen. Such tilting camera is movable in different angles by using the motorized actuator 255 to take tilt images of the screen, tilt being having the optical axis intersect the screen at a non-orthogonal angle.

Figure 4:
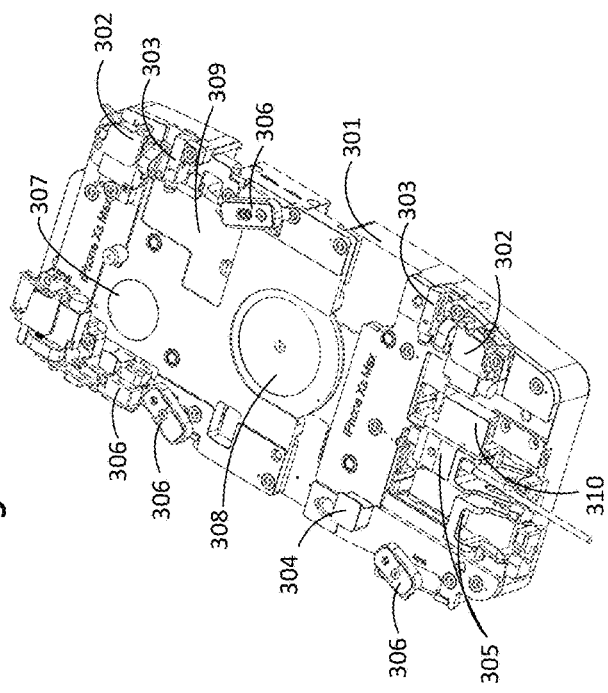
FIG. 4 illustrates a phone's fixture of the adapter.
Figure 3:
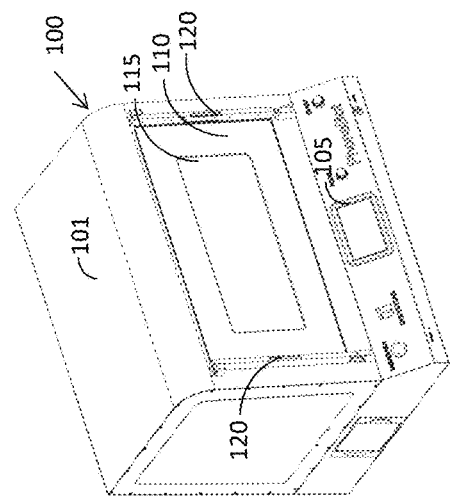
FIG. 3 illustrates an embodiment of an adapter without a phone.

The system can test different models of mobile devices by using the modular adapters 210. Examples of modular adapters 210 are illustrated in FIGS. 3-6. Each modular adapter 210 comprises a base 301 and plurality of phone fixtures 401 to accommodate different kinds of phone models. FIG. 3 illustrate an adapter configured to accept different iPhone models, here illustrated without an iPhone installed. FIG. 4 illustrates the phone's fixture 401 of the modular adapter 301. FIG. 5 illustrates the modular adapter of FIG. 3 with an iPhone mounted therein. FIG. 6 illustrates an adapter configurable for accepting a Samsung phone, illustrated with a phone installed. The general construction of the adapter of FIG. 6 is similar to that of FIG. 3, except that the various actuators and elements are at locations configured for actuating a Samsung phone. Therefore, the specific description of the elements of the adapter of FIG. 3 is also applicable to that of FIG. 6.

Each adapter 210 is capable of supporting a specific number of cellphone models, by changing the phone's fixture. Each adapter also includes connector actuators 305 configured to connect and disconnect cables, such as USB cable, headphones cable, etc. Each adapter also includes hard-button actuators 306 configured to operate the "hard" buttons on the mobile device, such as power button, volume, mute, etc. A window 309 is provided in each adapter, in a location configured to expose the cameras of the phone models to be used with the adapter, thus enabling each of the phone models to take a picture while positioned in the adapter. Also, a microphone 310 is positioned at a location of the phone's speaker to enable testing of the functionality of the phone's speaker.

The adapter of FIGS. 3 and 4 include linear phone fixing actuators 302, enabling the fixing of models by manipulating the positioning of the phone fixing pieces 303. In one example, the linear fixing pieces 303 urge the phone against alignment stops 304. The adapter also includes connector actuators 305 configured to connect and disconnect cables, depending on the iPhone models the adapter accepts. For example, an adapter that accepts iPhone 6 or iPhone 6 Plus includes actuators for headphone cable and lightening cable, while an adapter designed to accept iPhone 7/7Plus, iPhone 8/8Plus or iPhone X only needs an actuator for lightening cable, not headphone cable. Hard-button actuators 306 are configured to operate the power, volume, and mute buttons. Other adapters may include different hard-button actuators, for example, a Samsung adapted may also include a hard-button actuator dedicated for activating Bixby. FIG. 3 illustrates an NFC module 307 that is used to test the functionality of the NFC (Near-Field Communication) of the iPhone. FIG. 3 also illustrates a wireless charger module 308 that is used to test the functionality of the wireless charge.

FIG. 7 illustrates the underside of an adapter, thus enabling viewing of the testing modules positioned within the adapter. The following is an explanation of the various modules shown in FIG. 7.

The adapter of FIG. 7 includes two cable actuators, e.g., one data (Lightning) cable and one headphone cable. The data cable actuator generally consists of a plug housing 710, which freely slides on linear track 712. Motor 714 slides the plug housing 710 between engage and disengaged positions, thus plugging and unplugging the data cable from the phone. A similar arrangement is provided for the headphone cable, wherein plug housing 720 slides on linear track 722 and motor 724 slides the plug housing 720 between an engage and disengage positions.

A wireless charging board 735 is used to test the functionality of the wireless charging module of the phone, and a vibration module 738 is provided to sense vibration of the phone. Communications between the adapter and the system controller are handled by the adapter board 740, via plug 742, which engages a corresponding plug (not shown) on the table 205.

Figure 8:
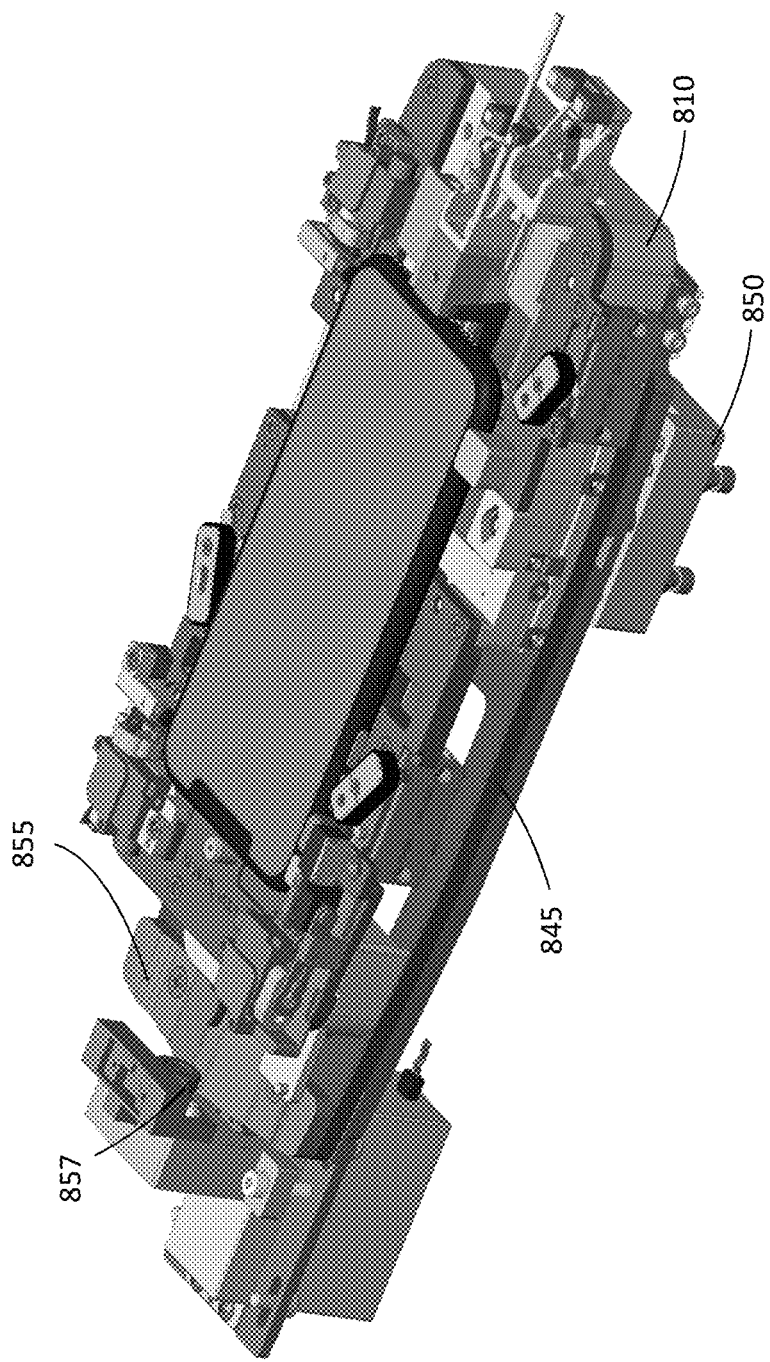

Generally, a cellphone has several motion sensors, such as a gyroscope and an accelerometer, which gives it data over the six axes on which it can operate. As noted, the system also checks the operability of these motion sensors. FIG. 8 illustrates one example of a motion testing module. The phone adapter 810 is mounted onto a rotation table 845, which itself is coupled onto the table 205. At one end, the rotation table 845 is attached to a rotation motor 850. At the other end the rotation table 845 includes a 3D rotation support, 855, which has a generally convex shape and is urged against roller 857. During testing, the motor is actuated to rotate back and forth, so as to move the rotation table 845 back and forth in an angular trace. As the rotation table moves, since the 3D rotation support is urged against the roller 857, that end of the phone moves up and down in elevation during the arc motion of the rotation table 845. This motion should be sensed by the motion sensors of the phone.

The conveyor belt 220 can be used to perform various testing of the camera and screen of the phone. For example, the conveyor belt 220 may have several color plates, each of a single color, e.g., a red plate, a white plate, a blue plate, etc. For testing, the system places one of the color plates under the phone adapter within the field of view of the phone's camera. The system then activates the stylus 232 to place the phone in a camera mode. Then the camera 235 is used to see what color is displayed on the phone's screen and compares it to the expected color. If a wrong color is displayed, a fault is indicated.

In another example, the conveyor 220 includes a panel with a bar code which corresponds to a hyperlink. The system places the bar code within the field of view of the camera, and the stylus is operated to activate the scanner function of the phone. As the scanner operates, it would recognize the barcode and would cause the phone to open a browser and follow the URL to the designated website. The camera 235 is used to image the screen to check that these functions indeed followed the proper procedure. Otherwise a fault is indicated.

While the invention has been described with reference to particular embodiments thereof, it is not limited to those embodiments. Specifically, various variations and modifications may be implemented by those of ordinary skill in the art without departing from the invention's spirit and scope, as defined by the appended claims.

The invention claimed is:

1. A system for testing functionality of mobile devices, comprising:
   a stage having a plurality of windows and a plurality of testing stations, each configured to receive one adapter;
   a plurality of adapters, each configured to receive at least one model of mobile device;
   an actuating head having a selector with a plurality of styluses;
   a placement system configured to transport the actuating head among the testing stations;
   at least one camera coupled to the placement system and configured to take images of screens of mobile devices;
   a picture presentation apparatus configured for presenting different pictures to be imaged by the mobile devices, wherein the picture presentation apparatus positions each picture below each of the plurality of windows so that the picture can be photographed by the mobile devices; and,
   a controller for activating the system for testing the mobile devices and evaluating data received from the system to determine the functionality of modules within each mobile device.

2. The system of claim 1, wherein the picture presentation apparatus is positioned below the stage, and wherein each of the testing stations includes one of the windows configured to expose part of the picture presentation apparatus to a camera of the mobile device.

3. The system of claim 2, wherein the picture presentation apparatus comprises a conveyor belt having a plurality of pictures mounted thereupon.

4. The system of claim 3, wherein one of the pictures comprises a barcode.

5. The system of claim 1, further comprising a plurality of motion actuators configured to move the adapters in three-dimension in space.

6. The system of claim 5, wherein each of the motion actuators comprises a rotation table, a motor coupled to one side of the rotation table, and a 3D rotation support urged against a roller.

7. The system of claim 1, wherein one of the styluses comprises a finger print simulator.

8. The system of claim 1, wherein each adapter further comprises a microphone.

9. The system of claim 1, wherein each adapter further comprises a wireless charger.

10. The system of claim 1, wherein the placement system comprises a gimbal configured for transporting a z-actuator in a horizontal plane, and wherein the actuating head is mounted onto the z-actuator.

11. The system of claim 1, further comprising a near-field communication module.

12. The system of claim 1, further comprising a vibration sensing module.

13. The system of claim 1, wherein the at least one camera comprises a first fixed-angle camera positioned in a true vertical orientation and a tilt camera mounted onto a motorized tilt actuator configured to image a phone screen at a tilt angle.

14. The system of claim 1, wherein each of the adapters comprises a plurality of linear fixing pieces and a plurality of alignment stops, wherein the plurality of linear fixing pieces urge the mobile device against the alignment stops.

15. A system for testing functionality of cellphones, comprising:
   a test bench having a plurality of test stations, each configured for receiving one adapter and each having a window;
   a plurality of adapters, each configurable to accept one cellphone selected from a plurality of cellphone models, each adapter having at least one cable actuator and one hard-button actuator;
   a stylus selector having a plurality of styluses;
   a placement mechanism configured to for placing the stylus selector above any of the adapters;
   a conveyor positioned below the test bench and having a plurality of picture plates formed thereupon.

16. The system of claim 15, wherein the placement mechanism comprises a z-actuator configured to position the stylus selector vertically, and a gimbal configured to position the z-actuator within the horizontal plane.

17. The system of claim 16, further comprising two cameras mounted onto the z-actuator, comprising a first fixed-angle camera positioned in a true vertical orientation and a tilt camera mounted onto a motorized tilt actuator configured to image a phone screen at a tilt angle.

18. The system of claim 17, further comprising a speaker mounted onto the z-actuator.

19. The system of claim 15, wherein each of the adapters further comprises a wireless charger.

20. The system of claim 15, wherein each of the adapters further comprises an NFC module.

21. The system of claim 15, wherein each of the cable adapters comprises a plug housing slidably mounted on a linear track, and a motor sliding the plug housing.

22. The system of claim 15, further comprising a plurality of rotating tables, each provided between the test bench and one of the adapters, the rotating table configured for imparting 3-D motion to the adapter.

23. The system of claim 15, wherein each of the test stations includes motion sensors testing, comprising a motorized actuator having actuating cams configured to individually move each adapter in three-dimensions.

\* \* \* \* \*